S. D. RUSSELL.
SICKLE PULLER.
APPLICATION FILED JULY 1, 1918.

1,302,595.

Patented May 6, 1919.

WITNESSES
George C. Myers

INVENTOR
STANLEY D. RUSSELL,
BY
ATTORNEYS

UNITED STATES PATENT OFFICE.

STANLEY D. RUSSELL, OF WINFIELD, KANSAS.

SICKLE-PULLER.

1,302,595. Specification of Letters Patent. Patented May 6, 1919.

Application filed July 1, 1918. Serial No. 242,975.

*To all whom it may concern:*

Be it known that I, STANLEY D. RUSSELL, a citizen of the United States, and a resident of Winfield, in the county of Cowley and State of Kansas, have invented certain new and useful Improvements in Sickle-Pullers, of which the following is a specification.

My invention is an improvement in sickle pullers, and has for its object to provide a device of the character specified especially adapted for removing the sickles from mowing machines and for replacing the same, wherein means is provided for permitting the removal or replacement of the sickle without the necessity of handling the same and from the rear of the sickle bar.

Figure 1:
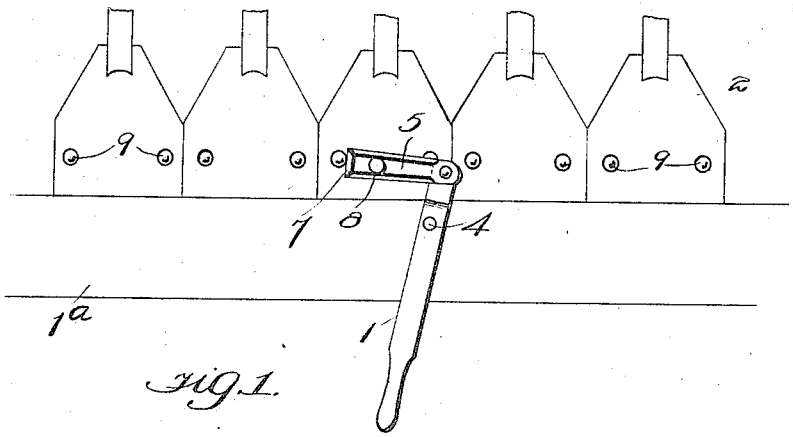
Figure 1 is a top plan view of a portion of the sickle bar showing the tool in use.
Figure 3:
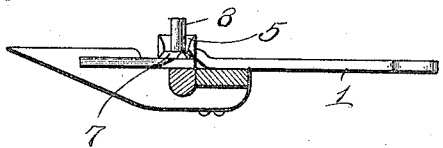
Fig. 3 is a transverse section through the sickle bar.
Figure 2:
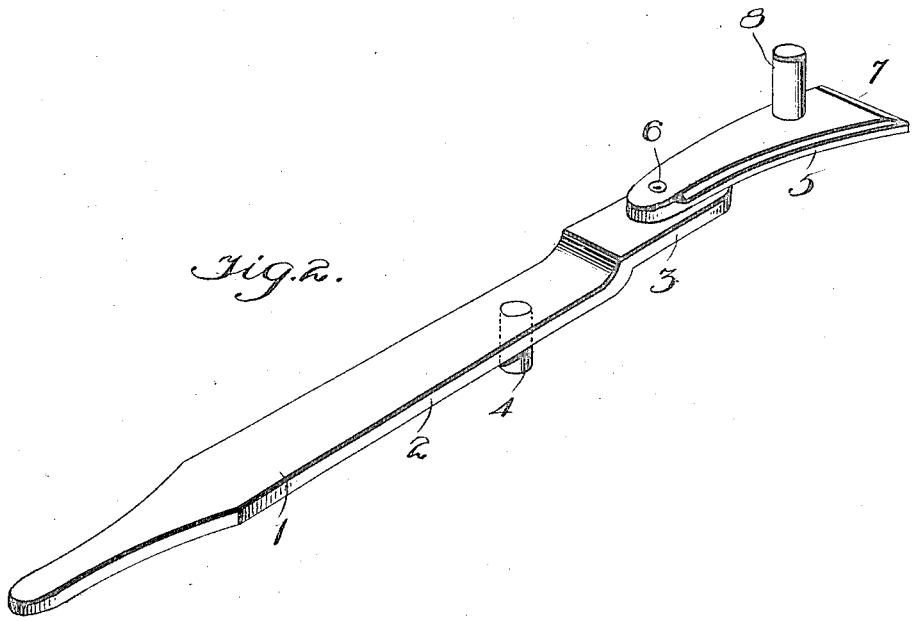
Fig. 2 is a perspective view of the improved tool.

The present embodiment of the invention is shown in connection with the sickle bar 1ª of a mower, the sickle bar carrying the usual sickle 2. The improvement comprises a lever 1, having at one end a grip and having the other end offset laterally from the plane of the lever, as shown at 3. The lever has intermediate its ends and adjacent to the offset portion thereof a depending pin 4, the said pin being adapted to engage the opening found in the sickle bars of mowers in order to provide a pivotal mounting for the lever.

A latch or pawl 5 is pivoted to the lever at the offset portion 3, as indicated at 6, and this latch or pawl is curved longitudinally as shown, being arranged with its convex face upward. The latch or pawl has its end beveled, as indicated at 7, and it is provided with an upstanding pin 8 forming a grip or handle for convenience in placing the latch or pawl.

In operation, the pivot pin 4 is engaged with the opening in the sickle bar, and by means of the grip 8 the latch or pawl 5 is turned at approximately right angles to the lever, and is engaged with one of the rivets 9 which connect the sickle plates to their supporting bar. Grasping the grip, the lever may now be swung to move the sickle from the sickle bar, the latch or pawl being engaged with the succeeding rivets as the sickle bar is moved.

The improved tool may be manufactured at a low cost, and in its use there is great saving of time and energy in quickly and easily removing sickles under any conditions. The tool permits powerful leverage to be obtained, with a tool of small compass which may be carried in the usual tool box or in the pocket of the operator. It is not necessary for the operator to go between the team and the machine to remove the sickle, and since it is not necessary to touch the sickle, there is no risk of becoming dirty or greasy, nor of receiving injury.

I claim:

1. A device of the character specified, comprising a lever having at one end a grip and having the other end offset upwardly from the plane of the lever, a latch or pawl pivoted to the said other end, said lever having intermediate its ends and near the end provided with the pawl a depending pin for the purpose specified, the latch or pawl having an upwardly extending grip.

2. A device of the character specified, comprising a lever having at one end a grip, a latch or pawl pivoted to the other end, said lever having intermediate its ends and near the end provided with the pawl a depending pin for the purpose specified, the latch or pawl having an upwardly extending grip.

STANLEY D. RUSSELL.

Witnesses:
E. D. PILE,
E. D. YOULE.

Copies of this patent may be obtained for five cents each, by addressing the "Commissioner of Patents, Washington, D. C."